United States Patent [19]

Inoue et al.

[11] Patent Number: 5,955,530
[45] Date of Patent: Sep. 21, 1999

[54] EASILY SIEVABLE POWDER COATING COMPOSITION

[75] Inventors: Koichi Inoue, Amagasaki; Yasuhiko Nakae, Kyoto; Hitoshi Nakatsuka, Neyagawa, all of Japan

[73] Assignee: Nippon Paint Co., Ltd., Osaka, Japan

[21] Appl. No.: 08/823,842

[22] Filed: Mar. 25, 1997

[30] Foreign Application Priority Data

Mar. 26, 1996 [JP] Japan .................................. 8-097773

[51] Int. Cl.⁶ ...................................................... C08K 3/00
[52] U.S. Cl. ............................ 524/493; 524/492; 524/494
[58] Field of Search ..................................... 524/492, 493, 524/494

[56] References Cited

U.S. PATENT DOCUMENTS 4,049,744  9/1977  Masters ............................... 260/837 R
5,554,681  9/1996  Patel .......................................... 524/506

OTHER PUBLICATIONS

"Handbook of Fillers for Plastics", eds. Katz and Milewski, (1987).

*Primary Examiner*—Edward J. Cain
*Attorney, Agent, or Firm*—Millen, White, Zelano, & Branigan, P.C.

[57] ABSTRACT

Finely divided hydrophobic silica powder having a number average particle size from 3 to 10 nm and a BET surface area from 195 to 290 m²/g is dry blended with particles of a thermosetting resin composition having a volumetric average particle size from 5 to 20 μm in a proportion from 0.05 to 2.0 parts per 100 parts of the resin particles on weight basis. Sieving efficiency of the powder coating composition thus processed is remarkably improved.

7 Claims, No Drawings

EASILY SIEVABLE POWDER COATING COMPOSITION

BACKGROUND OF THE INVENTION

This invention relates to a powder coating composition which is easy in handling, particularly in sieving.

Powder coating technology has become popular in finishing automobile bodies and parts, household electrical appliance and building materials because it does not use any organic solvent presenting environment pollution problems.

Powder coating compositions are generally produced by blending a binder resin with a curing agent and optionally other additives such as pigments, kneading the mixture under heat to make a molten mass, pulverizing solidified mass and then classifying the pulverized powder. The powder thus produced is applied onto a substrate using the electrostatic spray coating method or fluidized bed coating method to form a film, and then baked to form a cured film. The powder is sieved on site immediately before use to remove any agglomerated particles formed by blocking during transporting and storage. Portions of the powder not deposited onto the substrate are recovered and sieved to remove agglomerated particles and any particulate foreign matter for recycling of recovered powder.

Solvent type coating compositions have been conventionally used in the field in which a highly aesthetic finish is critical. In order to use the powder coating composition in that field, the powder must have a volumetric average particle size as fine as from 5 to 20 $\mu$m. However, the powder of a particle size in this range is not efficiently sievable not only in the classifying step of the powder as produced but also in the sieving step on site before or after the application onto the substrate because the powder tends to clog sieving screens more frequently than powder of larger particle sizes.

Therefore, a need exists for a powder coating composition which does not present the above problem in sieving.

SUMMARY OF THE INVENTION

The present invention provides a powder coating composition comprising particles of a thermosetting resin composition having a volumetric average particle size from 5 to 20 $\mu$m, and from 0.05 to 2.0 parts by weight per 100 parts by weight of said particles of finely divided hydrophobic silica powder having a number average particle size from 3 to 10 nm and a BET surface area from 195 to 290 m$^2$/g, said silica powder being dry blended with said particles.

In a preferred embodiment, said finely divided silica powder has a BET surface area from 230 to 290 m$^2$/g and has been surface-treated to block silanol groups on the surfaces thereof with a hydrophobic blocking agent.

DETAILED DESCRIPTION OF THE INVENTION

The powder coating composition of the present invention comprises particles of a thermosetting resin composition and finely divided hydrophobic silica powder dry blended with the resin particles. The term "particles of a thermosetting resin composition" as used herein refers to particles containing a binder resin, a curing agent and other additives produced by, as stated above, pulverizing a molten and then solidified mixture of the above components.

Except the presence of fine silica powder, the inventive powder coating composition is otherwise identical to conventional powder coating compositions. Because of this, any component including the binder resin, curing agent and other additives known in the art may be used for producing the thermosetting resin particles.

The binder resin must be a solid at room temperature and has a melting point from 120° C. to 200° C. The resin must also be capable of curing with an external curing agent. Typical examples thereof are polyester, epoxy or acrylic resins. When a high weatherability is desired, acrylic binder resins are used. Polyester resins are polycondensates of a polyhydric alcohol component such as ethylene glycol, propanediol, pentanediol, hexanediol, neopentyl glycol, trimethylolpropane or pentaerythritol, and a polycarboxylic acid component such as tetraphthalic, isophthalic, phthalic, succinic, glutaric, adipic, sebacic or β-hydroxypropionic acid. Any type of epoxy resins may be used provided they have a plurality of oxirane rings in the molecules. Typical examples are glycidyl ester type epoxy resin, glycidyl ether type epoxy resins represented by bisphenol A epoxy resins, alicyclic epoxy resins, and linear aliphatic epoxy resins. Acrylic binder resins are produced by copolymerizing an ethylenically unsaturated monomer such as styrene, methyl (meth)acrylate, ethyl (meth) acrylate, n-butyl (meth) acrylate, isobutyl (meth)acrylate or t-butyl (meth)acrylate with a functional acrylic monomer such as (meth)acrylic acid, glycidyl (meth)acrylate, or 2-methylglycidyl (meth) acrylate. The binder resin preferably has a Tg of at least 30° C. for preventing thermal deposition of resin particles to mill walls during the pulverizing step. The Tg of the binder resin preferably does not exceed 55° C. so that a flat film surface is formed by baking.

Curing agents are selected depending upon the type of functional group possessed by the binder resin. For polyester resins, polycarboxylic acids, melamine resins or blocked polyisocyanates are used. For epoxy resins, polycarboxylic acid anhydrides, dicyandimide or acrylic resins are used. For acrylic resins, polycarboxylic acid anhydrides, epoxy resins or aminoplast resins are used.

Examples of pigments are coloring pigments such as titanium dioxide, iron oxide, carbon black, phthalocyanine blue, phthalocyanine green, quinacridone pigments or azo pigments, and extender pigments such as talc, calcium carbonate or precipitated barium sulfate. Examples of other additives are surface conditioners such as polysiloxane or acrylic resin, plasticizers, UV absorbers, antioxidants, anti-cratering agents, pigment dispersants, curing catalysts and benzoin compounds.

The above materials are premixed in a mixer such as super mixer or Henschel mixer before kneading under heat wherein various materials are dispersed in molten state at molecule levels. Busco kneaders or extruders are used in the kneading step. Then the resulting hot mass is rolled into a sheet and allowed to solidify by cooling, followed by crushing into chips and pulverizing into fine particles having a desired particle size. Typically, super mixers, Henschel mixers or jet mills are used for producing fine particles. Before packaging, the fine particles are classified into a desired particle size distribution suitable for intended application. During the classifying step, coarse particles or finer particles or both are removed.

Thermosetting resin particles thus produced are packaged in a container and then shipped. In use, they are sieved before filling into a powder holder of applicator machines for removing large agglomerated particles formed by blocking of individual particles during transportation and storage periods. In the electrostatic spray method, particles not deposited onto the substrate are recovered and reused after blending with fresh particles. Since recovered particles contain dust and other particulate foreign matter, these particulate foreign matter must be removed by sieving.

Resin particles as fine as 20 μm or less in volumetric average particle size for use in highly aesthetic finishes have a remarkable tendency of clogging of wire screen of 42 to 325 mesh even sieved under vibration. Dry blending of finely divided hydrophobic silica powder as defined herein facilitates not only classifying the resin particles as produced but also sieving thereof on site.

According to the present invention, the finely divided hydrophobic silica powder must have a number average particle size from 3 to 10 nm and a BET surface area from 195 to 290 $m^2/g$, preferably from 230 to 290 $m^2/g$. Preferably, the silica powder is surface-treated to block silanol groups on the surfaces thereof with a hydrophobic blocking agent or hydrophobic silane coupling agent such as monoalkyltrihalosilane, dialkyldihalosilane or trialkylmonohalosilane. Hydrophobic silica powder meeting the above parameters is commercially available. Examples thereof include AEROSIL R-812 and AEROSIL R-812S both sold by Nippon Aerosil K.K. AEROSIL R-812S is particularly preferred. Other commercial proudcts comparable to the above products may also be used.

The amount of the silica powder generally ranges between 0.05 to 2.0 parts, preferably between 0.1 and 1.0 parts by weight per 100 parts by weight of the resin particles not containing the silica powder. Excessive addition of the silica powder will adversely affect flatness or other appearance properties of cured films.

Dry blending of the silica powder may be conducted before, during or after the classifying step of resin particles provided that the silica powder particles are not embedded in the resin particles.

The powder coating composition of the present invention is well suited in the electrostatic spray coating method including corona charging and frictional charging spray coating methods.

The following examples are given for illustrative purposes only but are not limiting. All parts and percents therein are by weight unless otherwise specified.

PRODUCTION EXAMPLE 1

Acrylic Binder Resin

A reaction vessel equipped with a thermometer, stirrer, condenser, nitrogen gas tube and drip funnel was charged with 63 parts of xylene and then heated to 130° C. To this were added dropwise a monomer mixture consisting of 45 parts of glycidyl methacrylate, 20 parts of styrene, 27 parts of methyl methacrylate and 8 parts of isobutyl methacrylate, and a solution of 6.5 parts of t-butylperoxy 2-ethylhexanoate in 6 parts of xylene over 3 hours using the drip funnel. After the addition, the reaction mixture was kept at 130° C. for 30 minutes. Then a solution of 6.1 parts of t-butylperoxy 2-ethylhexanoate in 7 parts of xylene was added dropwise followed by keeping the reaction mixture at 130° C. for additional 1 hour. After removing xylene by distillation in vacuo, an acrylic resin having a Tg of 55° C. and a number average molecular weight of 3,200 measured by the GPC method using polystyrene standard was obtained.

EXAMPLE 1

| Acrylic Powder Coating Composition | |
|---|---|
| Material | Parts |
| Acrylic resin of Production Example 1 | 48 |
| Decanedicarboxylic acid | 12 |
| Surface conditioner (CF-1056 sold by Toshiba silicone K.K.) | 0.1 |
| Benzoin | 0.3 |
| Bisphenol A epoxy resin YD-012 sold by Toto Kasei K.K. | 2.2 |

The above materials were premixed in a super mixer (Nippon Spindle K.K.) for 3 minutes. The premix was transferred to a kneader sold by Busco and kneaded at 100° C. The resulting hot mass was cooled to room temperature, crushed, pulverized in an atomizer sold by Fuji Powdal K.K. and classified pneumatically using pneumatic classifier Model DS-2 sold by-Nippon Pneumatic Industry K.K. Thermosetting resin particles having a volumetric average particle size of 10 μm were obtained.

100 parts of resin particles thus produced were placed in a Henschel mixer and mixed with 0.5 parts of AEROSIL R-812S (Nippon Aerosil K.K., nominal number average particle size of 7 nm, nominal BET surface area of 260 $m^2/g$) for 1 minute.

EXAMPLES 2 AND 3

Example 1 was followed except that the amount of AEROSIL R-812S was changed to 0.25 parts and 1.0 part, respectively.

EXAMPLE 4

Example 1 was followed except that AEROSIL R-812S was replaced with 0.5 parts of AEROSIL R-812 (Nippon Aerosil K.K., nominal number average particle size of 7 nm, nominal BET surface area of 220 $m^2/g$).

COMPARATIVE EXAMPLE 1

Example 1 was followed except that AEROSIL R-812S was replaced with 0.5 parts of AEROSIL 300 (hydrophilic silica powder-having a nominal particle size of 7 nm and a nominal BET surface area of 300 $m^2/g$, Nippon Aerosil K.K.).

COMPARATIVE EXAMPLE 2

Example 1 was followed except that AEROSIL R-812S was not added.

COMPARATIVE EXAMPLE 3

Example 1 was followed except that the amount of AEROSIL R-812S was increased to 3.0 parts.

COMPARATIVE EXAMPLE 4

Example 1 was followed except that AEROSIL R-812S was changed to 0.5 parts of AEROSIL R-974 (hydrophobic silica powder having a nominal particle size of 16 nm and a nominal BET surface area of 110 $m^2/g$).

EXAMPLE 5

| Polyester Powder Coating Composition | |
|---|---|
| Material | Parts |
| Polyester resin (FINEDIC M8021, Dainippon Ink And Chemicals Inc.) | 60 |
| ε-Caprolactam blocked polyisocyanate (ADDUCT B-1530, Huels) | 10 |
| Calcium carbonate | 5 |
| Titanium dioxide | 20 |
| Surface conditioner (F-1056) | 0.5 |

The above materials were processed as same as in Example 1 to obtain thermosetting resin particles having a volumetric average particle size of 10 μm. 100 parts of the resulting resin particles were processed with 0.5 parts of AEROSIL R-812S as in Example 1.

COMPARATIVE EXAMPLE 5

Example 5 was followed except that AEROSIL R-812S was not added.

EXAMPLE 6

| Epoxy Powder Coating Composition | |
|---|---|
| Material | Parts |
| Epoxy resin (EPIKOTE 1002, Yuka Shell Epoxy K.K.) | 65 |
| Dicyandiamide | 5 |
| Titanium dioxide | 20 |
| Culcium carbonate | 5 |
| Surface conditioner (F-1056) | 0.5 |

The above materials were processed as same as in Example 1 to obtain thermosetting resin particles having a volumetric average particle size of 10 μm. 100 parts of the resulting resin particles were processed with 0.5 parts of AEROSIL R-812S as in Example 1.

COMPARATIVE EXAMPLE 6

Example 6 was followed except that AEROSIL R-812S was not added.

Evaluation

Powder compositions of Examples 1–6 and Comparative Examples 1–6 were tested for angle of repose, sievability and film appearance according to the following methods. The results obtained are shown in Table 1 and Table 2 below.

Tg:

Measurement was made using a differential scanning calorimeter sold by Seiko Instruments Inc., under the name of SEIKO I SSC/5200.

Angle of repose:

The measurement was made using a powder tester sold by Hosokawa Micron K.K. under the name of Powder Tester PT-D.

Sievability:

Measurement was made using the above Powder Tester PT-D. A plastic bag is attached to the bottom of a circular 60 mesh seive having a dimeter of 20 cm. The sieve is attached to the tester and vibrated vertically at an amplitude of 1 mm. 100 g of sample is added rapidly to the sieve and time counting is started. After the vibration for 20 seconds, sieving is stopped and the weight of sample passed through the sieve during this period is measured. The measured weight is converted to a value representing the weight of sample passed during the period of 1 minute.

Film appearance:

Each coating composition was applied by the electrostatic spray method onto a zinc phosphate treated steel plate to a film thickness of 60±5 μm, and then baked at 140° C. for 20 minutes in a hot air oven. The film appearance was evaluated in terms of NSIC (%) measured by a reflected image distinctiveness meter sold by Suga Testing Instrument Co., Ltd.

TABLE 1

| | Example | | | | | |
|---|---|---|---|---|---|---|
| Item | 1 | 2 | 3 | 4 | 5 | 6 |
| Resin particle | | | | | | |
| Resin type | Acrylic | Acrylic | Acrylic | Acrylic | Polyester | Epoxy |
| Particle size, μm | 10 | 10 | 10 | 10 | 10 | 10 |
| Parts | 100 | 100 | 100 | 100 | 100 | 100 |
| Fine silica powder | | | | | | |
| AEROSIL | R-812S | R-812S | R-812S | R-812 | R-812S | R-812S |
| Particle size, nm | 7 | 7 | 7 | 7 | 7 | |
| BET surface area, m$^2$/g | 260 | 260 | 260 | 220 | 260 | 260 |
| Parts | 0.5 | 0.25 | 1.0 | 0.5 | 0.5 | 0.5 |
| Angle of repose, degree | 43 | 44 | 42 | 43 | 42 | 42 |
| Weight passed, g/minute | 376 | 361 | 383 | 328 | 380 | 385 |
| NSIC, % | 65 | 71 | 63 | 64 | 40 | 39 |

TABLE 2

| Item | Comparative Example | | | | | |
|---|---|---|---|---|---|---|
| | 1 | 2 | 3 | 4 | 5 | 6 |
| Resin particle | | | | | | |
| Resin type | Acrylic | Acrylic | Acrylic | Acrylic | Polyester | Epoxy |
| Particle size, μm | 10 | 10 | 10 | 10 | 10 | 10 |
| Parts | 100 | 100 | 100 | 100 | 100 | 100 |
| Fine silica powder | | | | | | |
| AEROSIL | 300 | Not added | R-812S | R-974 | Not added | Not added |
| Particle size, nm | 7 | | 7 | 16 | | |
| BET surface area, m$^2$/g | 300 | | 260 | 110 | | |
| Parts | 0.5 | | 3.0 | 0.5 | | |
| Angle of repose, degree | 49 | 50 | 42 | 44 | 49 | 48 |
| Weight passed, g/minute | 82 | 74 | 403 | 244 | 94 | 98 |
| NSIC, % | 54 | 75 | 55 | 65 | 41 | 42 |

From the results shown in Table 1 and Table 2, it is seen that the sievability of the powder coating compositions of Examples 1–6 increase at least 4 times compared with corresponding compositions of Comparative Examples 2,5 and 6 not containing the hydrophobic fine silica powder. Comparative Example 3 demonstrates that excessive addition of the silica powder adversely affect the film appearance. Comparative Examples 1 and 4 demonstrate that the addition of fine silica powder having hydrophilic nature or larger particle sizes are not effective to improve the sievability as desired.

We claim:

1. A powder coating composition comprising particles of a thermosetting resin composition having a volumetric average particle size from 5 to 20 μm, and from 0.05 to 2.0 parts by weight per 100 parts by weight of said resin particles of finely divided hydrophobic silica powder having a number average particle size from 3 to 10 nm and a BET surface area from 195 to 290 m$^2$/g, said silica powder being dry blended with said resin particles.

2. The powder coating composition according to claim 1 wherein said silica powder is surface-treated with a silane coupling agent to block at least a portion of silanol groups present on surfaces with a hydrophobic group.

3. The powder coating composition according to claim 1 wherein said BET surface area is from 230 to 290 m$^2$/g.

4. The powder coating composition according to claim 1 wherein said thermosetting resin comprises an acrylic, polyester or epoxy binder resin and a curing agent thereof.

5. The powder coating composition according to claim 4 wherein said acrylic binder resin has a Tg from 30 to 55° C. and a number average molecular weight from 1,000 to 4,000.

6. In a method of improving the sievability of particles of a thermosetting resin composition having a volumetric average particle size from 5 to 20 μm used in the powder coating technology, the improvement wherein from 0.05 to 2.0 parts by weight of finely divided hydrophobic silica powder having a number average particle size from 3 to 10 nm and a BET surface area from 195 to 290 m$^2$/g are dry blended per 100 parts by weight of said thermosetting resin particle.

7. The method according to claim 6 wherein said silica powder is surface-treated with a silane coupling agent to block at least a portion of silanol groups present on surfaces with a hydrophobic group.

* * * * *